Feb. 16, 1960  B. A. GEIGER  2,925,180
CONTINUOUS CENTRIFUGAL EXTRACTOR
Filed Jan. 15, 1957  2 Sheets-Sheet 1
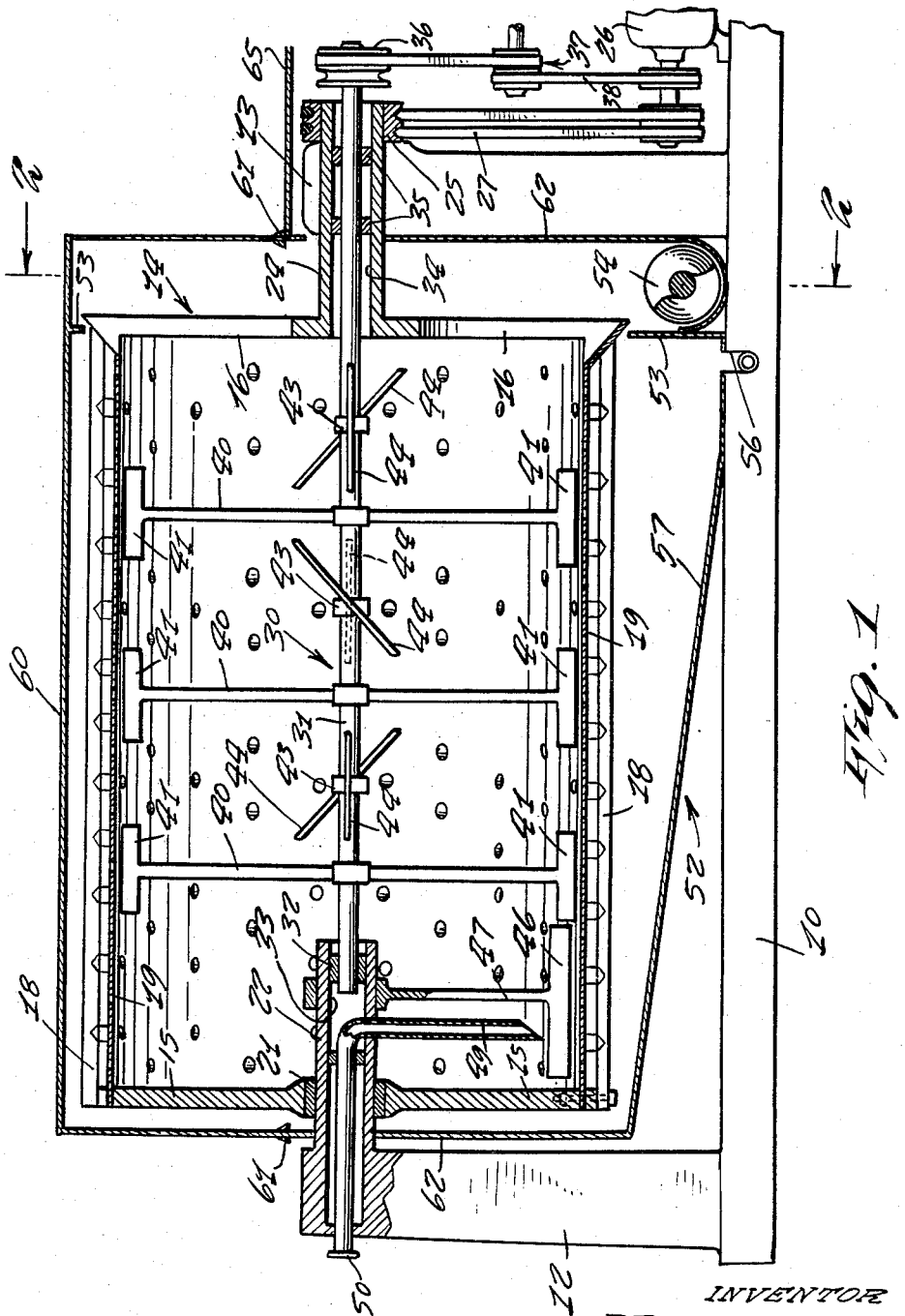
INVENTOR
BRUCE A. GEIGER
BY
Carl Miller
ATTORNEY

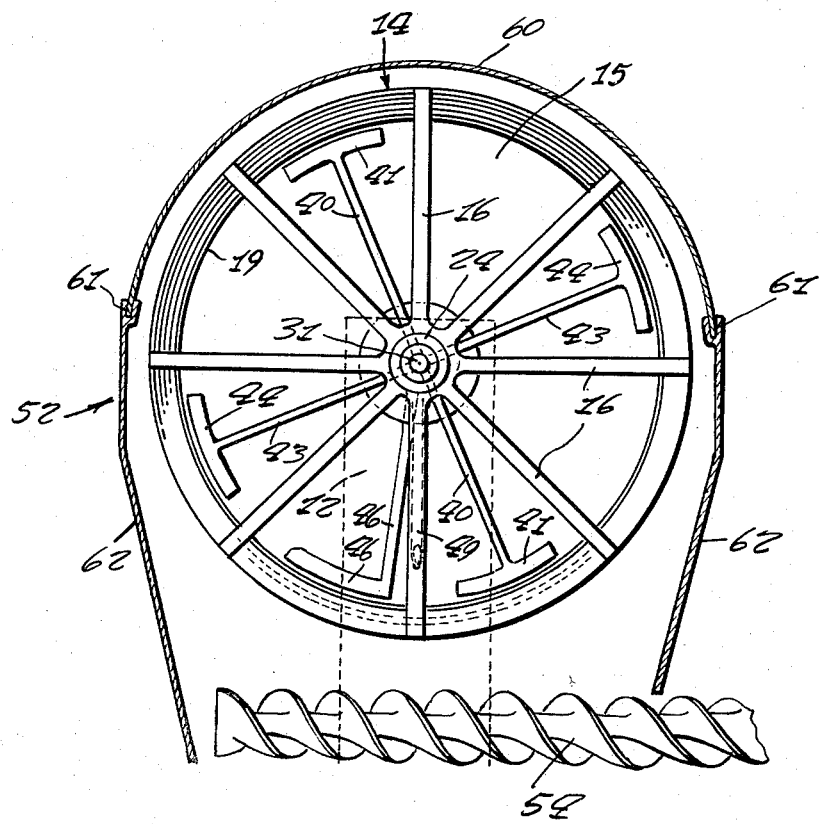

United States Patent Office 2,925,180
Patented Feb. 16, 1960

2,925,180

CONTINUOUS CENTRIFUGAL EXTRACTOR

Bruce A. Geiger, Westfield, N.J.

Application January 15, 1957, Serial No. 634,313

1 Claim. (Cl. 210—374)

This invention relates to centrifugal extractors and, more particularly, to centrifugal extractors for separating liquid and solid matter from ground fruit pulp.

Ordinarily, juice is removed from ground fruit in a batch type machine in which the centrifugal cylinder is loaded and operated to process a single batch of slurry. At the completion of each operation, the machine is reloaded for the next batch. While it has been found that this type of machine is satisfactory for small quantities of material, such is usually inefficient and time consuming when used for large quantities. A substantial amount of labor is required for the loading and unloading between batches. An object of this invention therefore is to provide a continuous centrifugal extractor that is simple in construction, efficient in operation, and which will overcome the aforementioned difficulties.

Another object of this invention is to provide a continuously operated centrifugal extractor that is automatically operative to direct the flow of ground fruit from the inlet side to the outlet side thereof while the juice is being extracted.

An additional object of this invention is to provide an extractor of the type described having a set of rotatable leveler and scraper blades for urging the material from the inlet side to the outlet side thereof and which includes separate collection means for the juice and dry pulp.

All of the foregoing and still further objects and advantages of this invention will become apparent from a study of the following specification, taken in connection with the accompanying drawing, wherein:

Figure 1 is a longitudinal cross sectional view of a centrifugal extractor made in accordance with the present invention; and Figure 2 is a cross sectional view taken along line 2—2 of Figure 1.

Referring now to the drawing, a centrifugal extractor made in accordance with the present invention is shown to include a stationary base 10 having an inlet side support post 12 and an outlet side support post 13 in aligned, spaced apart, relationship. A basket 14, closed at the inlet end 15 and open at the outlet end, is rotatably supported for rotation upon the support posts 12, 13. This basket is provided with a plurality of circumferentially spaced longitudinal stringers 18 that extend between the closed end 15 and radially extending struts 16 at the outlet side of the basket. The entire unit is enclosed by a perforated cylindrical wall 19 that is adapted to receive the ground fruit and permit the passage of the juice outwardly through the perforations under the centrifugal action of the machine. The center of the inlet end 15 is provided with a bearing 21 that rotatably engages with the fixed trunnion 22 of the support post 12. The radial struts 16 at the outlet end of the basket are secured to a centrally located trunnion 24 that is rotatably received within an opening in the support post 13 at that end. The outer end of the trunnion 24 has a sheave 25 secured thereto that is driven by an electric motor 26 through drive belts 27, whereby rotation is imparted to the basket 14. A continuator assembly 30 is supported within the basket 14 for relative rotation thereto and includes a longitudinal shaft 31 that is supported for rotation by means of a single bearing 32 at one end and a pair of spaced bearings 35 at the opposite end. Each of these bearings 32, 35 are disposed within longitudinal bores 33, 34, respectively, in the associated trunnion members. One end of the shaft 31 extends outwardly beyond the open end of the rotatable trunnion 24 and has a sheave 36 secured thereto that is driven by the motor 26 through a variable drive mechanism 37 and drive belts 38. By means of the variable drive mechanism, the continuator 30 is rotated at a slightly lower speed than the speed of rotation of the basket 14, for purposes hereinafter described.

Three sets of radially extending arms 40 are secured at spaced intervals along the length of the shaft 31. A leveler 41 is secured to each end of each arm 40 in slightly spaced apart relationship with respect to the inside surface of the basket 14. Three sets of similar arms 43 are secured to the shaft 31 adjacent to the outlet side of each of the leveler arms 40, each of which is provided with an angularly inclined scraper blade 44. It will be noted that the scraper blade and arm assemblies are spaced 90° from the placement of the leveler arms and blades. A stationary leveler blade 46 is supported upon a fixed arm 47 from the inner extremity of the stationary trunnion 22. The stationary leveler blade is in slightly greater spaced apart relationship with the inside surface of the basket 14 than the rotatable leveler and scraper blades hereinbefore described. A ground fruit inlet conduit 49 extends into proximity with the stationary leveler 46 and extends through the longitudinal bore 33 of the stationary trunnion and into communication with the exterior portion of the support post 12 to terminate in a coupling 50 through which ground fruit may be delivered.

The entire unit is enclosed within a collector housing 52 that has a divider type partition 53 which separates the waste pulp auger conveyor 54 from the liquid collection trough 56 at the lower part of the outlet side of the unit. The upper portion of this housing 52 is provided with a removable cover 60 that is received within the longitudinally extending grooves 61 formed along the upper edges of the lower wall member 62. A skirt 65 encloses the operating parts of the mechanism for safety and appearance purposes.

In operation, the motor 26 drives the basket 14 at any desired speed. For example, in extracting the juice from apples, the basket is rotated at approximately 2000 revolutions per minute. By means of the variable speed mechanism 37, the continuator 30 is rotated in the same direction at a slower rate of speed, such as 1996 revolutions per minute. The difference in speed determines the time interval that the pulp remains in the cylinder or the time that it takes for pulp to travel from the inlet side to the outlet side thereof. Thus, at the aforementioned speeds, approximately one and one-half minutes are required for the material to pass from one end to the other of a five foot long basket. The ground fruit is introduced into the basket through the inlet conduit 49 at which point the stationary leveler 46 is operative to spread the pulp in an even layer around the adjacent parts of the basket as it is rotated. The leveler and scraper blades 41, 44, respectively, rotating at a slightly lower rate of speed, are operative to urge the material from the inlet side toward the outlet side of the basket. During this movement, the juice is extracted by centrifugal force and flows down the inclined plane 57 into the collection trough 56. The dry pulp is moved toward the open end of the basket and is collected in the pulp conveyor 54 and removed from the machine. All the parts of the machine are readily accessible and of stainless construction so as to reduce maintenance costs and increase the efficiency of the machine.

While this invention has been described with particular reference to the specific form shown in the drawing, it is to be understood that such is not to be construed as imparting limitations upon the invention, which is best defined by the claim appended hereto.

Having thus described my invention, I claim as new and desire to secure by Letters Patent:

A centrifugal extractor for extracting juice from ground fruit pulp comprising, in combination, a base, a pair of spaced apart vertical support posts secured to said base, a perforated cylindrical basket rotatably supported upon said vertical posts, a continuator concentrically supported for rotation within said basket, one end of said basket comprising a ground fruit inlet and the opposite end thereof comprising a juice and pulp outlet, said continuator having leveler and scraper blades supported thereon directing ground fruit from said inlet toward said outlet, said leveler blades lying in planes parallel to the longitudinal axis of said basket, said scraper blades lying in planes defining acute angles with the longitudinal axis of said basket, and common drive means for effecting high speed rotation of said basket relative to said base, one of said support posts supporting the inlet side of said basket, the other one of said posts supporting the outlet side of said basket, said one post supporting said inlet side of said basket having an axially extending stationary trunnion defining an internal longitudinal bore, said inlet including a duct extending through said post and said bore into communication within the interior of said basket, said stationary trunnion having a stationary leveler blade in spaced relationship with the interior side of said basket, said levelers and scrapers carried by said continuator being closer to said interior surface of said basket than said stationary leveler, said extractor including a housing completely enclosing said basket and defining separate juice and pulp collector portions, a divider isolating said juice collector portion from said pulp collector portion, and said housing including a cover portion removably mounted relative to said base for providing access to the interior of said extractor housing.

References Cited in the file of this patent
UNITED STATES PATENTS

| | | |
|---|---|---|
| 1,024,624 | Dupont | Apr. 30, 1912 |
| 1,415,939 | Mabry | May 16, 1922 |
| 1,704,466 | Eddy | Mar. 5, 1929 |
| 2,021,081 | Nagao | Nov. 12, 1935 |